Figure 1:
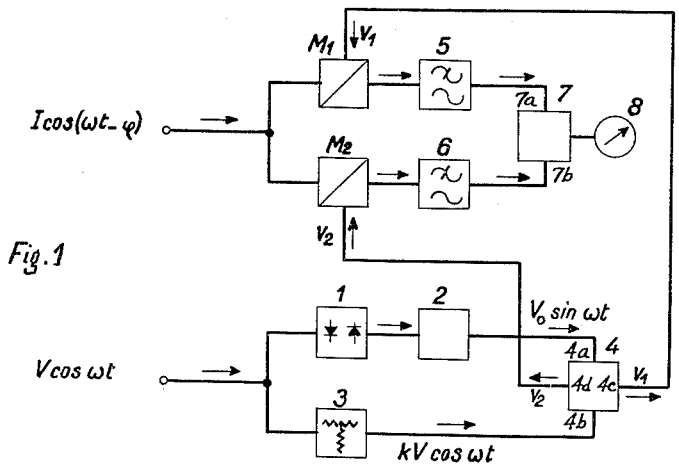

Nov. 7, 1961

J. OSWALD 3,008,086

DEVICE FOR THE MEASUREMENT OF THE POWER
ABSORBED BY AN ELECTRIC CIRCUIT

Filed July 24, 1959

INVENTOR
JACQUES OSWALD

BY

Paul M. Craig, Jr.
ATTORNEY

United States Patent Office 3,008,086
Patented Nov. 7, 1961

3,008,086
DEVICE FOR THE MEASUREMENT OF THE POWER ABSORBED BY AN ELECTRIC CIRCUIT

Jacques Oswald, Versailles, France, assignor to Compagnie Generale d'Electricite, Paris, France
Filed July 24, 1959, Ser. No. 829,440
Claims priority, application France Aug. 1, 1958
5 Claims. (Cl. 324—142)

The present invention relates to a device intended for the precise measurement of the power absorbed by an electric circuit, and more especially of the power absorbed by apparatus connected to an energy supply system, for example at 50 c./s., of which the voltage varies within respective limits on either side of a nominal value.

It is known that the real power absorbed in an element of an electric circuit in which there flows a current of strength $i$ at an instantaneous voltage $v$ is the mean value of the product $vi$.

Assuming that:

$$v = V \cos \omega t$$

and $$i = I \cos (\omega t - \varphi)$$

$V$ and $I$ designating respectively the amplitudes of $v$ and $i$, $\omega$ the angular frequency of the current, and $\varphi$ the phase shift of $i$ in relation to $v$, the mean power absorbed in the circuit is $$W = \frac{VI}{2} \cos \varphi$$

It might be thought that this product could be obtained by using a simple passive linear inversion modulator, and applying to the input circuit thereof the current $i$, or a current proportional to $i$, while its control circuit would receive the voltage $v$. The current collected in its output circuit would then be of the form:

$f(V)KI \cos (\omega t - \varphi) [\cos \omega t - \frac{1}{3} \cos 3\omega t$ $+ \frac{1}{5} \cos 5 \omega t \ldots]$ and the direct component of this current would be proportional to $f(V)I \cos \varphi$.

However, $f(V)$ is proportional to $V$ only at very small values of the said voltage, and it tends on the other hand towards a constant when $v$ becomes sufficiently high in relation to $I$. A device comprising a simple inversion modulator therefore permits of obtaining a current whose mean value gives a measure of the product $VI \cos \varphi$ which is independent of the dispersion of the characteristics of the non-linear elements of the said modulator only at very low values of the voltage, and it is therefore not suitable to meet practical requirements.

The device according to the invention is not subject to this limitation. It is characterised by the fact that it comprises two inversion or ring modulators, to the input terminals of which there is applied a current $$KI \cos (\omega t - \varphi)$$

proportional to $i$, and the output terminals of which are connected respectively, through low-pass filters, to the two input terminals of a mixing device, to the output of which there is connected a measuring instrument, the control circuits of the said modulators being connected respectively to two opposite sets of output terminals of a differential balanced eight-terminal network, of which the other two opposite sets of input terminals are fed with the voltage $V \cos \omega t$ respectively through a passive limiter and a 90° phase-shifting filter, on the one hand, and through an attenuating network on the other hand.

The operation of such a device will now be described with reference to the accompanying FIGURES 1 and 2, which show, respectively, a basic circuit diagram and a practical constructional form thereof.

$M_1$ and $M_2$ designate inversion or ring modulators which receive input currents which are proportional to current $i = I \cos (\omega t - \varphi)$ circulating in the circuit being tested. A voltage $v = V \cos \omega t$ at the terminals of the circuit being tested is applied on the one hand, by means of a passive limiter 1 and of a low-pass filter 2 causing a phase displacement of $\pi/2$, at one of the input terminals 4a of a balanced differential eight-terminal network 4, and on the other hand, this voltage is applied, by means of an attenuating network 3 to the input terminals 4b, coupled with terminals 4a, of network 4. The voltages at 4a and 4b are coupled in network 4 to produce both sum and difference control voltages appearing respectively at the other sets of terminals of the eight-terminal network. These sum and difference relationships will be more obvious from an inspection of the circuitry of network 4 in FIGURE 2. The control circuits of modulators $M_1$ and $M_2$ are respectively connected to the other sets of terminals 4c and 4d of the network 4 at which the sum and difference voltages referred to appear, these voltages being referred to as $v_1$ and $v_2$ hereinafter. The voltage at 4a is equal to $V_0 \sin \omega t$, $V_0$ being a constant voltage determined by "passive limitation" of $V \sin \omega t$. The voltage at 4b is $kV \cos \omega t$, $k$ being the attenuating factor of network 3, $kV$ being very much lower than $V_0$ $$\left(\text{for example} < \frac{V_0}{5}\right)$$

Consequently, the control voltages of modulators $M_1$ and $M_2$ assume respectively the values:

$$v_1 = V_0 \sin \omega t - kV \cos \omega t = H \sin (\omega t - \alpha)$$
$$v_2 = V_0 \sin \omega t + kV \cos \omega t = H \sin (\omega t + \alpha)$$

$\alpha$ and $H$ being defined as follows:

$$\text{Tan } \alpha = \frac{kV}{V_0}, \quad H = \frac{V_0}{\cos \alpha}$$

It is supposed that the attenuation caused by network 3, together with the output voltage of passive limiter 1, are so chosen that angle $\alpha$ remains small, within the limits of possible variations of $V$, whereas $H$ always remains great enough so that modulators $M_1$ and $M_2$ properly operate as reversers.

Under these conditions, the currents obtained at the output of the modulators $M_1$ and $M_2$ assume the respective values:

$i' = KI \cos (\omega t - \varphi) [\sin (\omega t - \alpha)$
$+ \frac{1}{3} \sin 3(\omega t - \alpha) + \ldots]$ $i'' = KI \cos (\omega t - \varphi) [\sin (\omega t + \alpha)$
$+ \frac{1}{3} \sin 3(\omega t + \alpha) + \ldots]$ These currents are applied, through low-pass filters 5 and 6 letting only subsist their continuous components $i'_c$ and $i''_c$, to two input terminals 7a and 7b of a mixing member 7, at the output of which a direct current is collected which is proportional to the difference of said components $i'_c$ and $i''_c$. This output current is then applied to a measuring instrument 8 of any usual type.

It can be immediately seen that:

$$i'_c = \frac{KI}{2} \sin (\varphi - \alpha), \quad i''_c = \frac{KI}{2} \sin (\varphi + \alpha)$$

and that therefore:

$$\frac{i''_0 - i'_0}{2} = \frac{KI}{2} \cos \varphi \sin \alpha$$

$$= \frac{KI}{2} \cos \varphi \cos \alpha \tan \alpha$$

$$= \frac{KK}{V_0} \frac{VI \cos \varphi}{2} \cos \alpha = \frac{Kk}{V_0} W \cos \alpha$$

The current measured by instrument 8 is therefore, if $\alpha$ remains relatively small, substantially proportional to the power in the circuit being tested.

By way of example, it may be assumed from this that $\alpha$ is made equal to 10° for the nominal value of the voltage V. If then V varies by ±20%, $\alpha$ varies from 8°, 2' to 11°, 57' and cos $\alpha$ from 0.978 to 0.990, its value being 0.985 with the nominal voltage of the supply system. The amplitude of $$\frac{V_0}{\cos \alpha}$$

of the auxiliary voltages $v_1$ and $v_2$ therefrom remains substantially constant, and the current proportional to cos $\alpha$ varies only by 1.2%. The precision is therefore satisfactory, and it could be further increased by diminishing the value of $\alpha$ for the nominal voltage.

Figure 2:
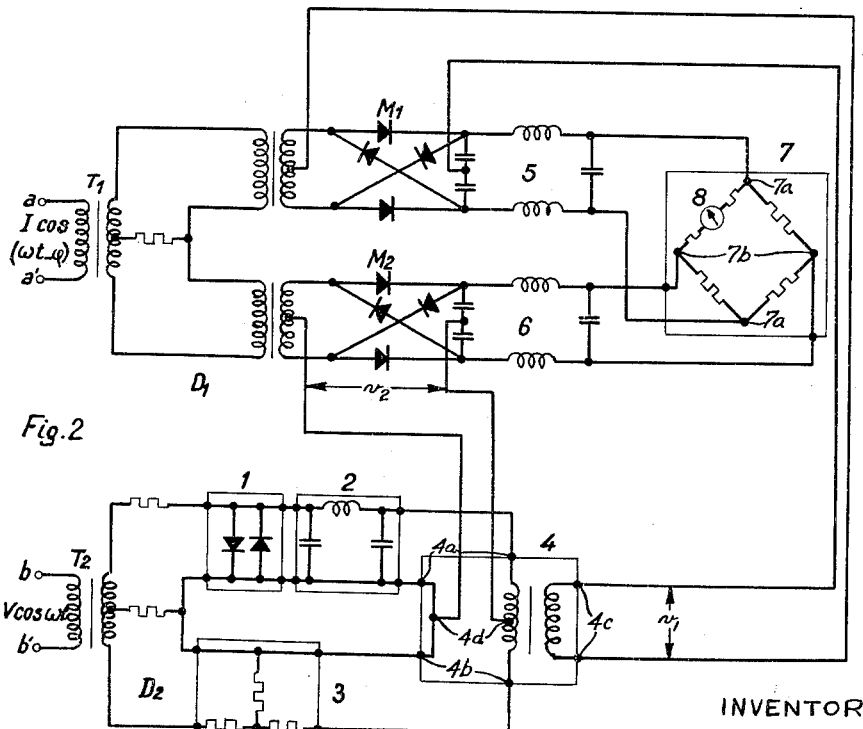

FIGURE 2 illustrates a practical constructional form of the measuring device according to the invention.

The current $ki = KI \cos (\omega t - \varphi)$ is applied to the terminals $aa'$ of the primary winding of the input transformer $T_1$ of a balanced differential network $D_1$, and the voltage $V \cos \omega t$ is applied to the terminals $bb'$ of the primary winding of the input transformer $T_2$ of a balanced differential network $D_2$.

The limiter 1 consists of two diodes connected in parallel and in opposition, the Zener effect of which is utilised. The phase-shifting filter 2 consists of a low-pass $\pi$ network. The modulators $M_1$ and $M_2$ are ring modulators.

The mixing member 7 is a bridge having equal branches, in one of which there is disposed a measuring instrument 8, from the dial of which the power $$W = \frac{VI}{2} \cos \varphi$$

can be determined directly if suitable calibration is included on the dial or from separate calibrating means.

It is obvious that by inserting the filter for producing a 90° phase shift at the output of the attenuating network instead of inserting it at the output of the limiter, the reactive power $$W' = \frac{VI}{2} \sin \varphi$$

could be measured instead of the real power $$W = \frac{VI}{2} \cos \varphi$$

I claim:
1. Device for measuring the power

$$W = \frac{VI}{2} \cos \varphi$$

absorbed in an electric circuit carrying a current of instantaneous strength $i = I \cos (\omega t - \varphi)$ and fed at an instantaneous voltage $v = V \cos \omega t$, V varying within restricted limits of the order of at most ±20%, about a mean value, the said device being characterised by the fact that it comprises two inversion modulators, of which the input circuits are fed by a current proportional to $i$, means for controlling the currents in the respective modulators by the application thereto of two voltages $v_1 = H \sin (\omega t - \alpha)$ and $v_2 = H \sin (\omega t + \alpha)$ obtained from $v$, $\alpha$ being an angle smaller than 10°, such that $$\tan \alpha = k \frac{V}{V_0}$$

$k$ being a constant and $V_0$ a reference voltage, H being equal to $$\frac{V_0}{\cos \alpha}$$

and always great enough so that the operation of the modulators as reversers is insured, and the output circuits of said modulators being connected respectively, through low-pass filters conducting only the direct modulation components proportional to $I \sin (\varphi - \alpha)$ and $I \sin (\varphi + \alpha)$, to the input terminals of a mixing member, to the output of which there is connected a current measuring instrument of known type.

2. Measuring device according to claim 1, characterised by the fact that, for the purpose of obtaining the auxiliary voltages $v_1$ and $v_2$ from $v$, it comprises a first control network having input terminals to which there is applied the voltage $v$ and two sets of terminals to which said input terminals are connected respectively, through a limiter and a filter producing a phase shift of 90°, on the one hand, and through an attenuating network on the other hand, a balanced differential network having two pairs of opposite terminals connected to said two sets of terminals and providing at another two pairs of opposite terminals the voltages $v_1$ and $v_2$.

3. A device for measuring power absorbed in an electric circuit comprising first circuit means having an input to which a signal corresponding to the alternating current in said circuit is applied and an output to which is connected indicating means for indicating said power, said first circuit means having two parallel circuit arrangements between said input and said output each including an inversion modulator and a low-pass filter, control circuit means including means responsive to the voltage of the electric circuit in which the power is being measured for supplying two control voltages to said inversion modulators, respectively, for controlling the currents in said circuit arrangements, and mixing means for mixing the output of each of said circuit arrangements at said first mentioned output to provide a signal thereat indicative of the power to be measured.

4. A device according to claim 3, wherein said control circuit means includes a balanced differential network supplying different control voltages to the respective inversion modulators.

5. A device according to claim 4, wherein said control circuit means includes two sets of input terminals for said balanced differential network and two sets of output terminals at which said different control voltages appear, means for connecting one set of the input terminals of said differential network for energization from the voltage of said circuit including a limiter and a phase-shifting means, and means for connecting the other set of input terminals of said differential network for energization from the voltage of said circuit including an attenuating network.

References Cited in the file of this patent

UNITED STATES PATENTS

| 2,282,396 | Cravath | May 12, 1942 |
| 2,829,343 | Hiller | Apr. 1, 1958 |

FOREIGN PATENTS

| 1,096,213 | France | June 16, 1955 |